US012719546B2

(12) United States Patent
McCoy et al.

(10) Patent No.: US 12,719,546 B2
(45) Date of Patent: Aug. 25, 2026

(54) BLIND DIRECTION OF ARRIVAL ESTIMATION SYSTEMS AND METHODS

(71) Applicant: CesiumAstro, Inc., Austin, TX (US)

(72) Inventors: James Wesley McCoy, Leander, TX (US); Thomas Magesacher, Austin, TX (US); Tanim Taher, Round Rock, TX (US)

(73) Assignee: CesiumAstro, Inc., Austin, TX (US)

( * ) Notice: Subject to any disclaimer, the term of this patent is extended or adjusted under 35 U.S.C. 154(b) by 0 days.

(21) Appl. No.: 18/236,438

(22) Filed: Aug. 22, 2023

(65) Prior Publication Data

US 2025/0233636 A1 Jul. 17, 2025

Related U.S. Application Data

(60) Provisional application No. 63/400,030, filed on Aug. 22, 2022.

(51) Int. Cl.
*H04W 4/00* (2018.01)
*H04B 7/06* (2006.01)
*H04B 7/08* (2006.01)

(52) U.S. Cl.
CPC ......... *H04B 7/0671* (2013.01); *H04B 7/0848* (2013.01); *H04B 7/086* (2013.01)

(58) Field of Classification Search
CPC ..... H04B 7/0671; H04B 7/0848; H04B 7/086
See application file for complete search history.

(56) References Cited

U.S. PATENT DOCUMENTS

| | | | | |
|---|---|---|---|---|
| 10,425,255 B2 * | 9/2019 | Obara | H04B 7/0413 | |
| 2003/0190904 A1 * | 10/2003 | Mar | H01Q 25/00 | 455/277.1 |
| 2018/0192298 A1 * | 7/2018 | Noerpel | H01Q 21/22 | |
| 2021/0344524 A1 * | 11/2021 | Shikida | H04B 7/0617 | |
| 2021/0409061 A1 * | 12/2021 | Judd | H04B 1/0475 | |
| 2023/0154342 A1 * | 5/2023 | Yasini | G01S 5/0269 | 701/3 |
| 2023/0179296 A1 * | 6/2023 | Morris | G01S 3/38 | 375/262 |
| 2023/0308312 A1 * | 9/2023 | Asplund | H04B 17/12 | |

* cited by examiner

*Primary Examiner* — Abdelnabi O Musa
(74) *Attorney, Agent, or Firm* — Hogan Lovells US LLP

(57) ABSTRACT

A circuit may include an input to receive a signal corresponding to a radio frequency signal received at each element of an antenna array. The circuit may include a beamforming circuit configured to determine two or more samples of a symbol period of the signal from each antenna element and to determine the error estimates for each antenna element based on the two or more samples. The beamforming circuit may be configured to determine one of a line or a plane that best fits the error estimates; determine a direction of arrival of the radio frequency signal based on one or more parameters of the line or the plane and determine a fractional delay for each antenna element based on the direction of arrival of the radio frequency signal.

20 Claims, 5 Drawing Sheets

BLIND DIRECTION OF ARRIVAL ESTIMATION SYSTEMS AND METHODS

CROSS-REFERENCE TO RELATED APPLICATION(S)

The present disclosure is a non-provisional of and claims priority to U.S. Provisional Patent Application No. 63/400,030 filed on Aug. 22, 2022 and entitled "Blind Direction of Arrival Estimation Systems and Methods," which is incorporated herein by reference in its entirety.

FIELD

The present disclosure is generally related to radio frequency signal reception using an antenna array, and more particularly to systems and methods of estimating the direction of arrival of a radio frequency signal without a priori knowledge of the signal modulation.

BACKGROUND

Radio frequency (RF) signals are used in communication devices such as transmitters, receivers, computers, televisions, mobile phones, satellites, base stations, and other systems used in wireless communications. For example, RF signals may communicate voice data, message data, and other data from a transmitting system to a receiving system through the air, from terrestrial base stations to satellites, and between satellites. Typically, RF signals used in communications may be within a frequency range that extends from amplitude modulated (AM) radio frequencies of approximately 50 kilohertz (kHz) through microwave frequencies over 1 Gigahertz (GHz). The 5G communications network currently being deployed by mobile phone service providers is configured to operate over a wide range of frequencies including 600-850 Megahertz (MHz) for low-band 5G, 2.5-3.7 GHz for mid-band 5G, and 25-39 GHz for high-band 5G.

In general, RF signals are propagating electromagnetic fields that carry data between an emitting antenna system and a receiving antenna system. The receiving antenna system may include multiple antenna elements arranged in a particular configuration, each of which is configured to convert a received electromagnetic waveform into an electrical signal. Though the RF signals travel at the speed of light, each antenna element may receive the RF signal at a different point in time, producing timing offsets, which need to be accounted for to recover the data from the received RF signal.

SUMMARY

Embodiments of systems, methods, and devices are described herein that may be configured to utilize timing offsets or fractional delays between antenna elements of the antenna array to determine the direction of arrival (DoA). The systems, methods, and devices may use the determined DoA to tune the receiving antenna to lock onto a received signal. In some implementations, the system may include an estimator that may be configured to determine statistics of a single-carrier waveform over an ensemble of signals over one symbol period. In an example, the sum of the squared magnitude of each sample produces sine wave with a significant DC offset. The phase estimate of the sine wave is directly related to the delay of the RF waveform between elements plus some error of the timing (fractional delay or timing offset). The estimator is blind in that it does not require any priori knowledge of the modulation format except for the symbol frequency.

In some implementations, a circuit may include an input to receive a signal corresponding to a radio frequency signal received at each element of an antenna array. The circuit may include a beamforming circuit configured to determine two or more samples of a symbol period of the signal from each antenna element and to determine timing estimates for each antenna element based on the two or more samples. The beamforming circuit may be configured to determine one of a line or a plane that optimally fits each error estimate; determine a direction of arrival of the radio frequency signal based on one or more parameters of the line or the plane and determine a fractional delay for each antenna element based on the direction of arrival of the radio frequency signal.

In other implementations, a method may include method comprises receiving a signal from each of a plurality of antenna elements of an antenna array, the signal corresponding to a radio frequency signal received at the antenna array and determining at least two samples of the signal over a symbol period for each of the plurality of antenna elements. The method may include determining error estimates for each antenna element of the plurality of antenna elements, determining a line or a plane that fits each of the error estimates, and determining a direction of arrival for the radio frequency signal by performing a lookup based on one or more parameters associated with the line or the plane. The method may include determining an element delay for each element of the antenna array based on the direction of arrival.

In still other implementations, a circuit may include an input to receive a signal corresponding to a radio frequency signal received at each element of an antenna array and a beamforming circuit coupled to the input. The beamforming circuit is configured to determine two or more samples of a symbol period of the signal from each antenna element, square a power value of each of the two or more samples, and add the squared power values for each of the two or more samples to produce a sinusoidal signal. The beamforming circuit is configured to correlate the sinusoidal signal to one or more second sinusoidal signals to determine an error estimate for each element of the antenna array and determine one of a line or a plane that intersects each error estimate. The beamforming circuit is configured to determine a direction of arrival of the radio frequency signal by looking up the direction of arrival from direction of arrival data in a memory based on one or more parameters of the line or the plane. The beamforming circuit may determine a fractional delay for each antenna element based on the determined direction of arrival of the radio frequency signal.

BRIEF DESCRIPTION OF THE DRAWINGS

The detailed description is set forth with reference to the accompanying figures. In the figures, the left most digit(s) of a reference number identifies the figure in which the reference number first appears. The use of the same reference numbers in different figures indicates similar or identical items or features.

While implementations are described in this disclosure by way of example, those skilled in the art will recognize that the implementations are not limited to the examples or figures described. The figures and detailed description thereto are not intended to limit implementations to the particular form disclosed, but on the contrary, the intention is to cover all modifications, equivalents, and alternatives falling within the spirit and scope as defined by the appended claims. The headings used in this disclosure are for organizational purposes only and are not meant to limit the scope of the description or the claims. As used throughout this application, the word "may" is used in a permissive sense (in other words, the term "may" is intended to mean "having the potential to") instead of in a mandatory sense (as in "must"). Similarly, the terms "include", "including", and "includes" mean "including, but not limited to".

DETAILED DESCRIPTION OF ILLUSTRATIVE EMBODIMENTS

Systems, methods, and circuits described below may include an estimator configured to determine statistics of a single-carrier waveform of an ensemble of signals over one symbol period. Similar to observing an eye diagram of a signal, the estimator may determine the time offset or error based on the determined statistics. The sum of the squared magnitude of each of the signals may yield a sine wave with a significant DC offset. The phase of the sine wave is directly related to the timing error or fractional delay. The estimator may be configured to function based on the symbol period and without a priori knowledge of the modulation format.

Figure 1:
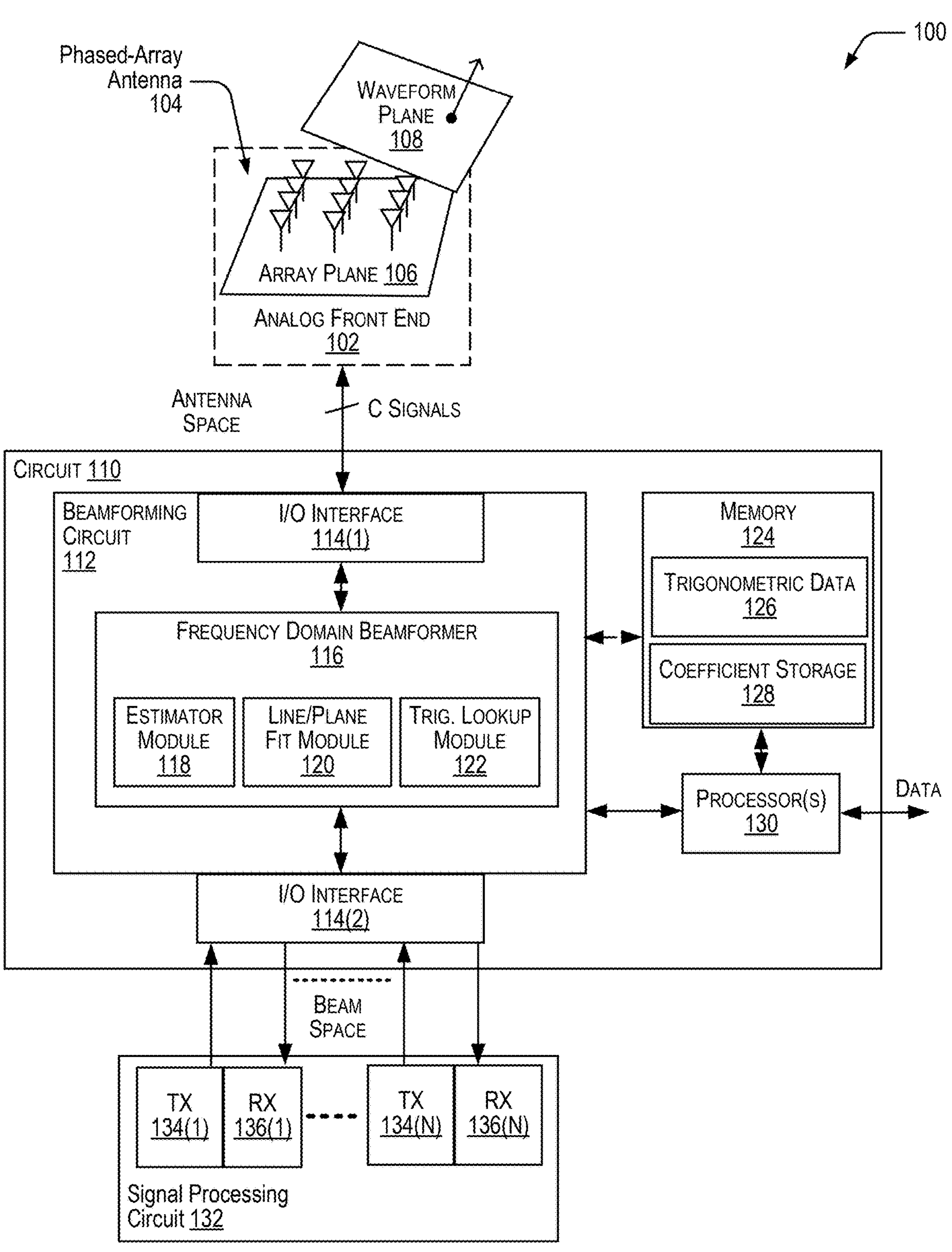
FIG. 1 depicts a block diagram of a system configured to provide efficient frequency domain beamforming, in accordance with certain embodiments of the present disclosure.

FIG. 1 depicts a block diagram of a system configured to provide efficient frequency domain beamforming, in accordance with certain embodiments of the present disclosure. The system 100 may include an analog front end 102, which may include an array plane 106 including a phased-array antenna 104 formed from a plurality of antenna elements. In an alternative implementation, the system 100 may include a linear array. Each antenna element of the phased-array antenna 104 may be configured to receive and send RF signals. Each antenna element may be coupled to circuitry associated with the analog front end 102 and configured to provide signals indicative of a received RF signal. Each antenna element may also receive signals from the circuitry of the analog front end 102 and may transmit an RF signal related to the received signals to a receiving device. In some implementations, the analog front end 102 may include or may be coupled to digital-to-analog converters (DACs), up-conversion mixers, down-conversion mixers, power amplifiers, and other circuitry that may filter, amplify, phase-shift, or otherwise adjust received signals or signals for transmission.

The circuitry associated with the analog front end 102 may be configured to receive and amplify the signals from the antenna elements and to provide signals for transmission. Additionally, the circuitry within the analog RF front end 102 may be configured to communicate signals to a circuit 110 including a beamforming circuit 112.

In some implementations, the circuit 110 may include or may be coupled to an analog-to-digital converter (ADC) and digital-to-analog converter (DAC), which may be coupled to the analog RF front end 102. In some implementations, the ADC, the DAC, other circuitry, or any combination thereof may be integrated within the circuit 110 or and may be positioned between the analog front end 102 and the circuit 110. The ADC may convert analog signals from the analog front end 102 into digital data that may be processed by the circuit 110, including the beamforming circuit 112. Additionally, the DAC may convert digital data from the circuit 110, such as the beamforming circuit 112, into analog signals that may be provided to the analog front end 102 for transmission via the phased-array antenna 104.

The circuit 110 may include an input/output (I/O) interface 114(1) coupled to the analog front end 102, an I/O interface 114(2) coupled to a processing circuit 130, and a digital beamformer circuit 116 coupled to the I/O interfaces 114. The digital beamformer circuit 114 may include an estimator module 118 configured to determine the statistics of the single-carrier waveform over an ensemble of signals over one symbol period and to determine the timing error or fractional delay for each antenna element. The digital beamformer circuit 114 may include a line/plane fit module 120 configured to fit a line or plane through a collected set of measured delays for each element according to common linear regression or data fitting techniques, determining the new delay for each element. The digital beamformer circuit 114 may include a trigonometric lookup module 122 configured to perform arctangent lookup (x2) for a planar antenna array implementation or arcsine lookup for a linear antenna array implementation to retrieve precalculated direction information from trigonometric data 126 stored in a memory 124 to determine the DoA.

One or more of the beamforming circuit 112 or the digital beamformer circuit 116 may be implemented as an application-specific integrated circuit (ASIC), a field-programmable gate array (PFGA) or a processing circuit configured to execute instructions that may be stored in a memory 124. The memory 124 may include one or more non-volatile memory devices. In some implementations, the beamforming circuit 112 may be coupled directly to the memory 124, which may store filter coefficients in a coefficient storage 122, trigonometric data 126, processor-readable instructions, other data, or any combination thereof. Alternatively, the digital beamforming circuit 112 may be coupled to the memory 124 indirectly through a processor 130. In some implementations, the processor 139 may receive data from a data source, such as another processor, an input device, or other source, and may provide the data to the digital beamforming circuit 112 for transmission.

The digital beamforming circuit 112 may provide data to or receive data from the signal processing circuit 132. The signal processing circuit 132 may include one or more transmit path circuit 134 and one or more receive path circuits 136. The beamforming circuit 112 may determine $N_{Antenna}$ by $N_{Beam}$ data streams, each of which may be provided to one of the receive path circuits 136. When sending data via the antenna array 104, the process may be reversed. In some implementations, the memory 124, the coefficient storage 128, and the processor 130 may be part of the signal processing circuit 136. Other implementations are also possible.

The frequency domain beamformer circuit 116 may be used to process I-Q data streams associated with received beam samples or associated with received channel samples. In operation, the estimator module 118 of the frequency domain beamformer circuit 116 may estimate delays from a small number of samples of a symbol period of the received signal. The line/plane fit module 120 may determine or fit a line or plane through a collected set of measured delays. In a linear antenna array configuration, the line/plane fit module 120 may determine or fit a line to the timing estimates for each element according to common linear regression techniques, determining the new delay for each element. In a planar antenna array configuration, the line/plane fit module 120 may determine or fit a plane to the timing estimates. The line/plane fit module 120 may determine the slope of the line or the orientation of the plane and estimate the DoA trigonometrically by performing a lookup operation.

For the linear array, the angle Ø of the DoA may be determined according to the following equation:

$$\emptyset = \arcsin(2 f_c \tau) \quad (1)$$

assuming λ/2 spacing where λ represents the wavelength, $f_c$ represents the carrier frequency, Ø represents the DoA, and τ represents the slope of the fitted line through the delay measurements.

For a planar array such as the phased array antenna 106 of FIG. 1, the DoA can be determined from the orientation of the fitted plane. The line/plane fit module 120 may determine a vector that is normal to the plane and determine its subcomponents (x, y, and z). The trigonometric lookup module 122 may then determine the azimuth angle as the arctangent of the ratio of x and y (arctan(x/y)) and may determine the elevation angle as the arctangent of the ratio of y and z (arctan(y/z)).

The array configuration can then be tuned to the new angles/delays. In some implementations, the process may be repeated to track the DoA.

In general, the physical configuration of the antenna elements of the antenna array, such as a linear array or the array plane 104 of the phased array 106, is known. Using the known configuration, much of the mathematics for fitting the plane can be precomputed once for the whole array because it has to do with the element configuration. Thus, the fractional delays for a plurality of received signals from different DoAs may be determined in advance, and the DoA data may be stored in the trigonometric data 126 of the memory 122 and retrieved via a lookup operation. By looking up the trigonometric data 126 based on the slope/orientation of the fitted line or plane, the computational complexity is reduced by more than an order of magnitude, improving the speed of the tuning operations and significantly reducing overall power consumption.

In operation, the digital beamformer circuit 116 may be configured to estimate the fractional delay based on as few as two samples of the symbol period. An example of a method of determining the delay for a received signal at each antenna element is described below with respect to FIGS. 2-4.

Figure 2:
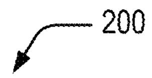
FIG. 2 depicts an eye diagram of multiple samples a radio frequency signal taken over a single symbol period that depicts the time offset or error for a selected antenna element of an antenna array, in accordance with certain embodiments of the present disclosure.
Figure 2:
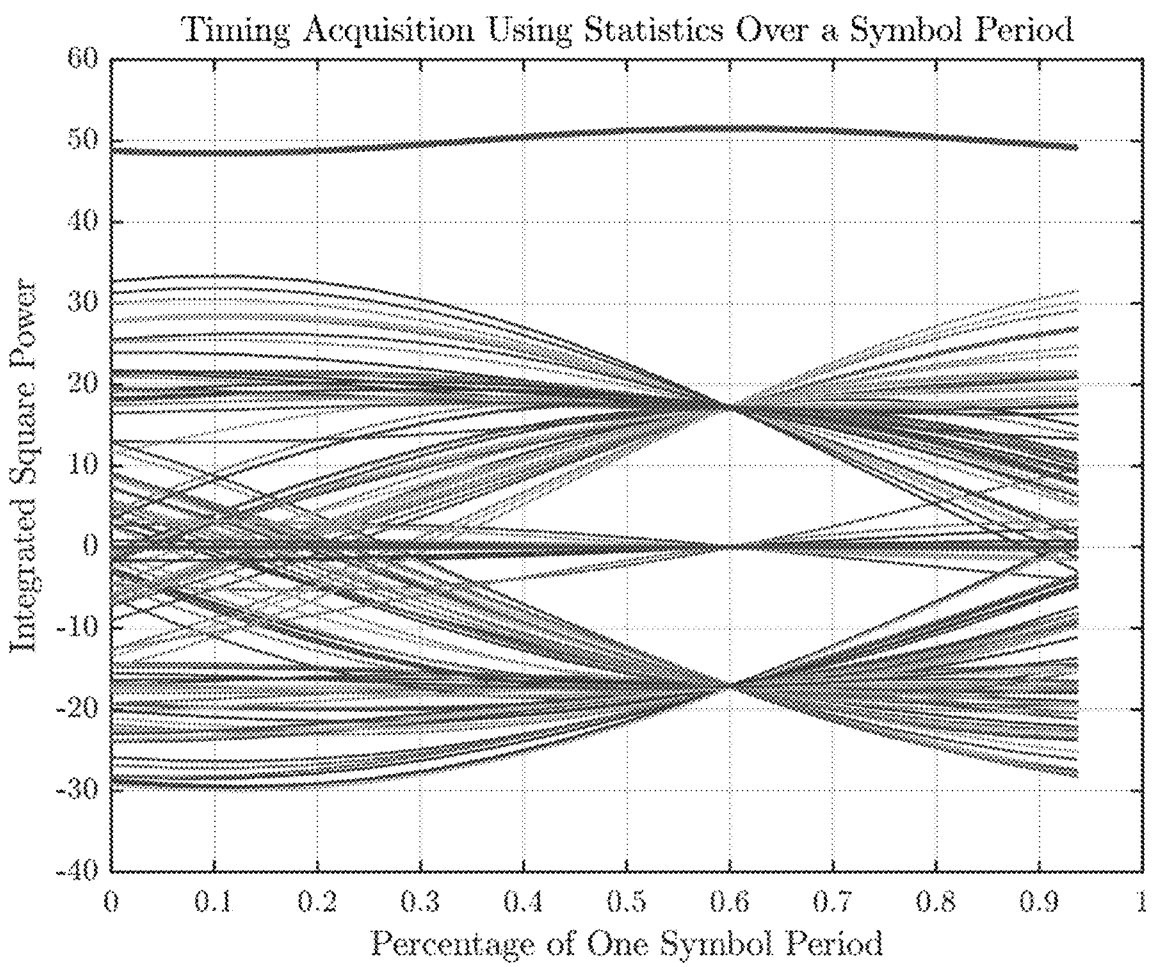

FIG. 2 depicts an eye diagram 200 of multiple samples a radio frequency signal taken over a single symbol period that depicts the time offset or error for a selected antenna element of an antenna array, in accordance with certain embodiments of the present disclosure. In general, the eye diagram 200 may depict waveforms captured over one or more integer-related periods. Each line represents the square power value of the waveform over the symbol period. While the example eye graph 200 depicted in FIG. 2 includes over 30 samples of the received signal, the estimator module 118 may be configured to determine the fractional delay based on as few as two samples.

In this example, the square power values converge at convergence points at approximately 0.6 or 60% of the symbol period. In many instances, the convergence points can be seen in as few as two samples, so the estimator module 118 may determine the fractional delays based on two or more samples. The estimator module 118 may determine the statistics of the single-carrier waveform over an ensemble of signals over one symbol period. The sum of the squared magnitude in the vertical direction of the eye diagram 200 yields a sine wave with a significant DC offset, which is shown at the top of the eye graph 200. The phase of the sine wave is directly related to the error of the timing. The estimator module 118 may be blind, meaning that it does not require knowledge of the modulation format. However, the estimator module 118 may know the symbol period and may be at least partially dependent on the modulation format. To find the timing, the sine wave of one period is correlated with a sine wave corresponding to the convergence point.

Figure 3:
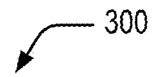
FIG. 3 depicts a graph of the integrated power of the samples of the single symbol period in FIG. 2 forming a sine wave with a direct current (DC) offset, in accordance with certain embodiments of the present disclosure.
Figure 3:
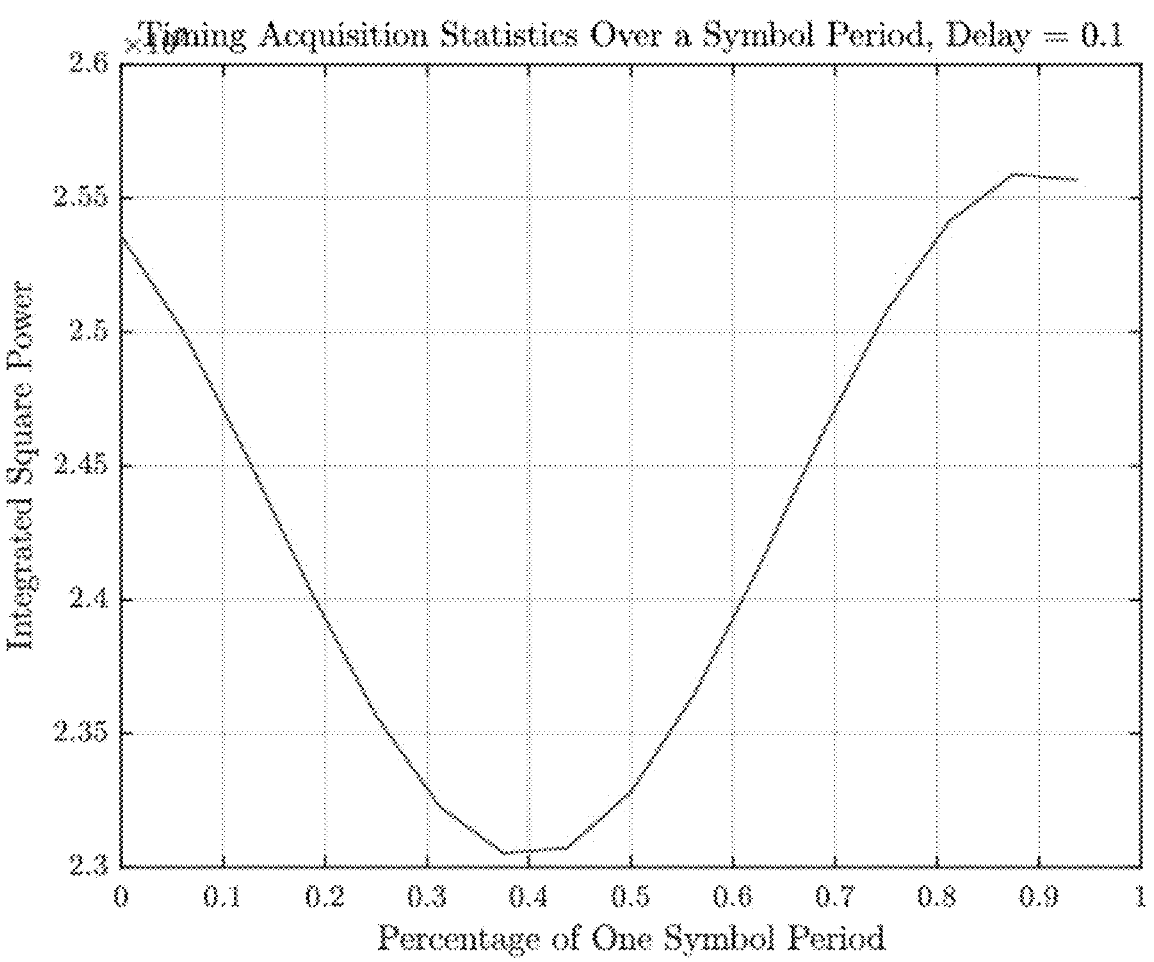

FIG. 3 depicts a graph 300 of the integrated power of the samples of the single symbol period in FIG. 2 forming a sine wave with a direct current (DC) offset, in accordance with certain embodiments of the present disclosure. A correlation of the sine wave shown in FIG. 2 with another sine wave that is correlated to the convergence point enables determination of the timing offset of the received signal from the ideal timing. This correlation may be accomplished with a discrete Fourier transform (DFT) or another form of correlation with a sinusoid. Since satellite communication signals do not experience time dispersion, this correlation technique works well.

In some implementations, the estimator module 118 may observe an integer number (two or more) of cycles of the waveform and use the same technique to detect the symbol rate of the transmitted signal using a DFT or correlation with sinusoids of different periods. The phase of the spectral lines of each DFT component will be directly related to the timing error or estimate of the signal with the corresponding symbol rate.

In some implementations, the estimator module 118 may be configured to estimate the fractional delay of signals having integer related symbol rates. In an example, the estimator module 118 may observe a single cycle or multiple cycles in the same graph. When the beamformer circuit 116 performs a DFT operation or correlates the symbols with different frequencies, the estimator module 118 may differentiate signals of different frequencies.

Figure 4:
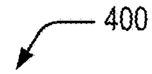
FIG. 4 depicts a graph of a spectral plot of the radio frequency signal of FIG. 2, in accordance with certain embodiments of the present disclosure.
Figure 4:
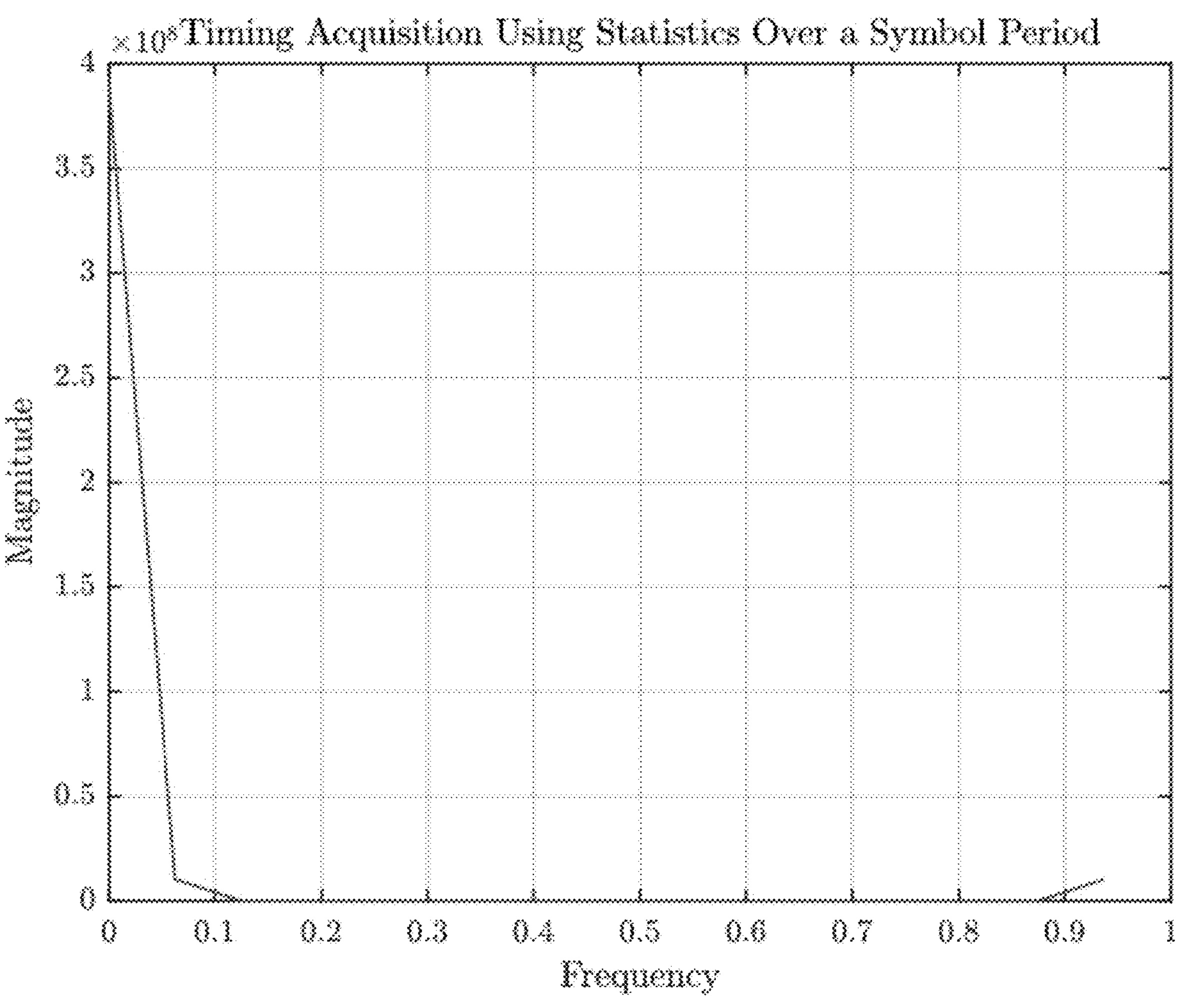

FIG. 4 depicts a graph 400 of a spectral plot of the radio frequency signal of FIG. 2, in accordance with certain embodiments of the present disclosure. The graph 400 shows a large DC component at zero that decreases exponentially until approximately 0.06 of the percentage of the signal frequency. At 0.06, the graph 400 depicts a corner or leg, and this is the point of interest. This spectral value may be computed with a DFT or via a correlation operation. The phase of the spectral lines of each DFT component or each correlation will be directly related to the timing error or estimate of the signal with the corresponding symbol rate.

The line/plane fit module 120 may utilize the fractional delay data indicative of the times of arrival of the signal to fit a line or plane through each of the delay data to determine linear or planar fit that correlates to the samples. The line/plane fit module 120 may determine the slope of the line or extrapolate the XYZ coordinates of the plane. The trigonometric lookup module 122 may use the slope or plane information to retrieve the DoA data 126 from the memory 124.

Figure 5:
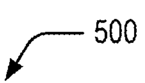
FIG. 5 depicts a flow diagram of a method of blind estimation of the direction of arrival of the radio frequency signal, in accordance with certain embodiments of the present disclosure.
Figure 5:
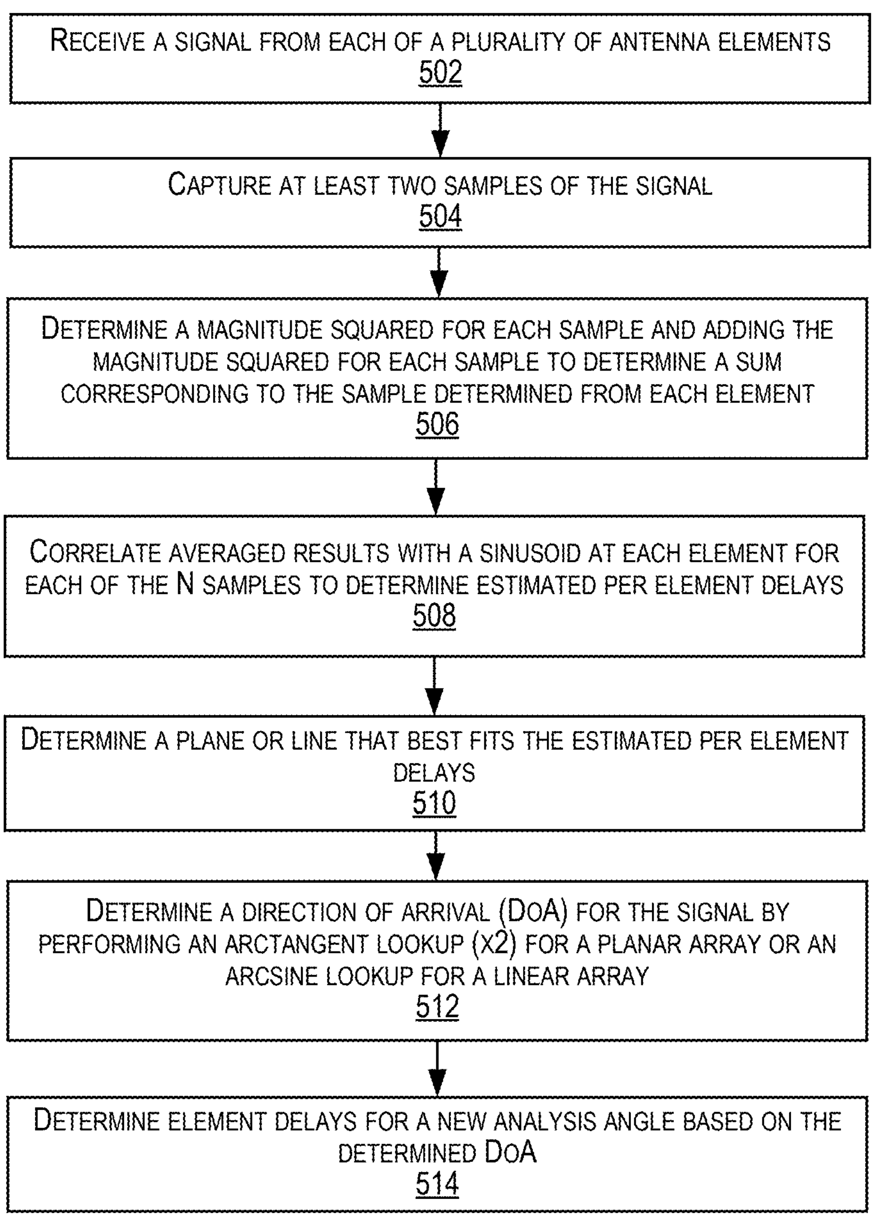

FIG. 5 depicts a flow diagram of a method 500 of blind estimation of the direction of arrival of the radio frequency signal, in accordance with certain embodiments of the present disclosure. The method 500 may be implemented by the circuit 110 of FIG. 1. In particular, the frequency domain beamformer circuit 116 may determine the DoA of the received signal.

At 502, the method 500 may include receiving a signal from each of a plurality of antenna elements. Each of the antenna elements may be part of the array plane 106 in FIG. 1 or may be part of a linear antenna array. Each antenna element may receive the RF signal at a unique time such that the signal reception is fractionally delayed at each antenna element relative to other antenna elements.

At 504, the method 500 may include capturing at least two samples of each signal. The estimator module 118 may determine two or more samples of a single symbol period and may use the two or more samples to determine the time delays. In some implementations, the estimator module 118 may be configured to adjust the sample rate as low as possible while still receiving sufficient samples to determine the sine wave. In some implementations, two samples may be sufficient to determine the sine wave.

At 506, the method 500 may include determining a magnitude squared for each sample and adding the magnitude squared for each sample to determine a sum corresponding to the sample determined from each element. As shown in FIG. 2, the sum of the squared power values for each sample across the symbol period produces a sinusoid signal, which may be used to determine the delay for each antenna element.

At 508, the method 500 may include correlating averaged results with a sinusoid at each element for each of the N samples to determine estimated per element delays. By correlating the sine wave formed by summing the squared power values with another sine wave, the estimator module 118 may determine the timing offset of the received signal relative to the ideal timing. This correlation may be accomplished with a DFT operation or another form of correlation with the ideal sinusoid.

At 510, the method 500 may include determining a plane or line through the estimated per element delays. The line/plane fit module 120 may determine the plane or line through the estimated per element delays. In a linear antenna array configuration, the line/plane fit module 120 may determine or fit a line to the timing estimates for each element according to common linear regression techniques, determining the new delay for each element. In a planar antenna array configuration, the line/plane fit module 120 may determine or fit a plane to the timing estimates.

At 512, the method 500 may include determining a direction of arrival (DoA) for the signal by performing an arctangent lookup (x2) for a planar array or an arcsine lookup for a linear array based on a parameter associated with the determined plane or line. For the linear array, the angle Ø of the DoA may be determined according to the following equation:

$$\emptyset = \arcsin(2 f_c \tau) \tag{2}$$

assuming λ/2 spacing where λ represents the wavelength, $f_c$ represents the carrier frequency, and τ represents the slope of the fitted line through the delay measurements. The trigonometric lookup module 122 may retrieve the angle data from the trigonometric data 126 in the memory 124.

For a planar array such as the phased array antenna 106 of FIG. 1, the DoA can be determined from the orientation of the fitted plane. The line/plane fit module 120 may determine a vector that is normal to the plane and determine its subcomponents (x, y, and z). The trigonometric lookup module 122 may then determine the azimuth angle as the arctangent of the ratio of x and y (arctan(x/y)) and may determine the elevation angle as the arctangent of the ratio of y and z (arctan(y/z)) by looking up the planar data from the trigonometric data 126 in the memory 124.

At 514, the method 500 may include determining element delays for a new analysis angle based on the determined DoA. The frequency domain beamformer circuit 116 may configure one or more filters based on the determined DoA. The frequency domain beamformer circuit 116 may then be repeated using the configured filters to lock onto the signal. Additionally, the estimator module 118 may repeat the process to continue tracking a new signal.

While the correlation in block 508 is used to determine the delays, the same technique may be used to detect the symbol rate of the received signal using a DFT operation or a correlation operation with sinusoids of different periods. The phase of the spectral lines of each correlation component may be directly related to the timing error or estimate of the signal with the corresponding symbol rate.

In conjunction with the systems, methods, and devices described above with respect to FIGS. 1-5, a digital beamforming circuit 112 may include an estimator 118 configured to utilize timing offsets or fractional delays between antenna elements of the antenna array to determine the direction of arrival (DoA). The systems, methods, and devices may use the determined DoA to tune the receiving antenna to lock onto a received signal. In some implementations, the system may include an estimator that may be configured to determine statistics of a single-carrier waveform over an ensemble of signals over one symbol period. In an example, the sum of the squared magnitude of each sample produces sine wave with a significant DC offset. The phase estimate of the sine wave is directly related to the delay of the RF waveform between elements plus some error of the timing (fractional delay or timing offset). The estimator is blind in that it does not require any priori knowledge of the modulation format except for the symbol frequency.

Although the present invention has been described with reference to preferred embodiments, workers skilled in the art will recognize that changes may be made in form and detail without departing from the scope of the invention.

What is claimed is:

1. A circuit comprising:

an input to receive a signal corresponding to a radio frequency signal received at each element of an antenna array;

a beamforming circuit configured to:

determine two or more samples of a symbol period of the signal from each antenna element;

determine error estimates for each antenna element based on the two or more samples;

determine one of a line or a plane that intersects each error estimate;

determine a direction of arrival of the radio frequency signal based on one or more parameters of the line or the plane; and determine a fractional delay for each antenna element based on the direction of arrival of the radio frequency signal.

2. The circuit of claim 1, wherein:

the antenna array comprises a planar array;

the beamforming circuit is configured to:

determine the plane that best fits the error estimates;

determine the one or more parameters by determining a vector that is normal to the plane and determining x, y, and z values associated with three-dimensional subcomponents of the vector; and lookup the direction of arrival based on the x, y, and z values.

3. The circuit of claim 2, wherein the beamforming circuit is configured to determine an azimuth angle of the direction of arrival based on an arctangent of the ratio of the x value over the y value (arctan (x/y)).

4. The circuit of claim 2, wherein the beamforming circuit is configured to determine an elevation angle of the direction of arrival based on the arctangent of the ratio of the y value over the z value (arctan (y/z)).

5. The circuit of claim 1, wherein:

the antenna array comprises a linear antenna array;

the beamforming circuit is configured to:

determine the line that intersects each error estimate based on a linear regression technique;

determine the slope of the line; and lookup the direction of arrival based on one or more parameters of the slope.

6. The circuit of claim 5, wherein the direction of arrival is determined by the arcsine of two times the carrier frequency times the slope of the line as follows:

$$\emptyset = \arcsin(2 f_c \tau)$$

wherein:

a spacing is λ/2;

λ represents the wavelength;

$f_c$ represents the carrier frequency;

Ø represents a direction of arrival (DoA), and

τ represents the slope of the line.

7. The circuit of claim 1, wherein the beamforming circuit comprises an application specific integrated circuit.

8. The circuit of claim 1, wherein the two or more samples comprises less than five samples.

9. The circuit of claim 1, wherein the beamforming circuit is configured to:

square a magnitude of each of the two or more samples;

sum the magnitudes to determine a sinusoidal signal; and correlate the sinusoidal signal to a second sine signal to determine the error estimates.

10. The circuit of claim 9, wherein the beamforming circuit is configured to determine a symbol rate of the radio frequency signal by correlating the sinusoidal signal with second sinusoids of different symbol periods.

11. A method comprises:

receiving a signal from each of a plurality of antenna elements of an antenna array, the signal corresponding to a radio frequency signal received at the antenna array;

determining at least two samples of the signal over a symbol period for each of the plurality of antenna elements;

determining error estimates for each antenna element of the plurality of antenna elements;

determining a line or a plane that fits each of the error estimates;

determining a direction of arrival for the radio frequency signal by performing a lookup based on one or more parameters associated with the line or the plane; and determining an element delay for each element of the antenna array based on the direction of arrival.

12. The method of claim 11, wherein determining the error estimates comprises:

determining a magnitude squared for each sample;

adding the magnitude squared for each sample to determine an averaged result corresponding to the sample determined from each element;

correlating the averaged results to a sinusoid at each element for each of the samples to determine estimated per element delays; and wherein the line or plane intersects each of the estimated per element delays.

13. The method of claim 12, further comprising determining a symbol rate of the radio frequency signal by correlating the averaged results with sinusoids of different symbol periods.

14. The method of claim 11, wherein:

the antenna array comprises a planar array;

the method further comprises:

determining the plane that best fits the error estimates;

determining the one or more parameters by determining a vector that is normal to the plane and determining x, y, and z values associated with three-dimensional subcomponents of the vector; and performing a lookup operation to determine the direction of arrival based on the x, y, and z values.

15. The method of claim 14, further comprising determining an azimuth angle of the direction of arrival based on an arctangent of the ratio of the x value over the y value (arctan (x/y)).

16. The method of claim 14, further comprising determining an elevation angle of the direction of arrival based on the arctangent of the ratio of the y value over the z value (arctan (y/z)).

17. The method of claim 11, wherein:

the antenna array comprises a linear antenna array;

the method further comprises:

determining the line that intersects each error estimate based on a linear regression technique;

determining the slope of the line; and determining the direction of arrival based on one or more parameters of the slope.

18. The method of claim 17, wherein the direction of arrival is determined by the arcsine of two times the carrier frequency times the slope of the line as follows:

$$\emptyset = \arcsin(2 f_c \tau)$$

wherein:

a spacing is λ/2;

λ represents the wavelength;

$f_c$ represents the carrier frequency;

Ø represents a direction of arrival (DoA), and

τ represents the slope of the line.

19. A circuit comprising:

an input to receive a signal corresponding to a radio frequency signal received at each element of an antenna array;

a beamforming circuit configured to:

determine two or more samples of a symbol period of the signal from each antenna element;

square a power value of each of the two or more samples;

add the squared power values for each of the two or more samples to produce a sinusoidal signal;

correlate the sinusoidal signal to one or more second sinusoidal signals to determine an error estimate for each element of the antenna array;

determine one of a line or a plane that best fits the error estimates;

determine a direction of arrival of the radio frequency signal by looking up the direction of arrival from direction of arrival data in a memory based on one or more parameters of the line or the plane; and determine a fractional delay for each antenna element based on the determined direction of arrival of the radio frequency signal.

20. The circuit of claim 19, wherein the beamforming circuit is configured to:

determine the plane that best fits the error estimates;

determine the one or more parameters by determining a vector that is normal to the plane and determining x, y, and z values associated with three-dimensional sub-components of the vector;

perform a lookup operation to determine the direction of arrival based on the x, y, and z values; and determine an azimuth angle of the direction of arrival based on an arctangent of the ratio of the x value over the y value (arctan (x/y)).

* * * * *